(12) United States Patent
Mikawa

(10) Patent No.: US 7,974,511 B2
(45) Date of Patent: Jul. 5, 2011

(54) IMAGE RECORDING APPARATUS CAPABLE OF RECORDING INFORMATION ASSOCIATED WITH LOCATION UPON IMAGE SENSING TOGETHER WITH SENSED IMAGE DATA, AND CONTROL METHOD THEREOF

(75) Inventor: Takuma Mikawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1129 days.

(21) Appl. No.: 10/653,951

(22) Filed: Sep. 4, 2003

(65) Prior Publication Data

US 2004/0047606 A1 Mar. 11, 2004

(30) Foreign Application Priority Data

Sep. 9, 2002 (JP) .................................. 2002-263133

(51) Int. Cl.
| | |
|---|---|
| H04N 5/765 | (2006.01) |
| H04N 5/931 | (2006.01) |
| H04N 5/932 | (2006.01) |
| H04N 5/77 | (2006.01) |
| H04N 9/80 | (2006.01) |
| H04N 5/92 | (2006.01) |
| H04N 5/917 | (2006.01) |
| H04N 5/89 | (2006.01) |
| G11B 27/00 | (2006.01) |

(52) U.S. Cl. ........ 386/200; 386/209; 386/210; 386/223; 386/224; 386/227; 386/242; 386/278; 386/286; 386/326; 386/331; 386/334; 386/335

(58) Field of Classification Search .................... 386/38, 386/95, 117, 120, 1, 46, 121, 83, 200, 209, 386/210, 223, 224, 227, 242, 278, 286, 326, 386/331, 334, 335; 348/247.99, 231.2–231.6, 348/232, 552

See application file for complete search history.

(56) References Cited

U.S. PATENT DOCUMENTS

| | | | | |
|---|---|---|---|---|
| 5,062,056 | A | * | 10/1991 | Lo et al. ......................... 235/411 |
| 5,598,339 | A | * | 1/1997 | Yoshihara et al. ............ 701/213 |
| 5,726,660 | A | | 3/1998 | Purdy et al. .................... 342/357 |
| 6,007,261 | A | | 12/1999 | Fujita et al. ..................... 400/61 |
| 6,226,449 | B1 | * | 5/2001 | Inoue et al. .................... 386/120 |
| 6,282,362 | B1 | * | 8/2001 | Murphy et al. ................ 386/46 |
| 6,377,744 | B1 | * | 4/2002 | Wakui ............................ 386/46 |
| 6,437,797 | B1 | * | 8/2002 | Ota ................................ 345/638 |
| 2001/0026263 | A1 | * | 10/2001 | Kanamori et al. ............ 345/156 |
| 2002/0026263 | A1 | * | 2/2002 | Matsumoto .................... 700/174 |
| 2002/0080276 | A1 | * | 6/2002 | Mori et al. ..................... 348/553 |
| 2002/0097645 | A1 | | 7/2002 | Mikawa ....................... 369/47.1 |

FOREIGN PATENT DOCUMENTS

| | | |
|---|---|---|
| JP | 10-254746 | 9/1998 |
| JP | 2000-92418 | 3/2000 |
| WO | 00/72577 | 11/2000 |

* cited by examiner

*Primary Examiner* — Thai Tran
*Assistant Examiner* — Daquan Zhao
(74) *Attorney, Agent, or Firm* — Fitzpatrick, Cella, Harper & Scinto

(57) ABSTRACT

There is disclosed an image recording apparatus which automatically records location information that the user can easily understand in an image recording apparatus which records a sensed image and location information associated with the image sensing location of that image in association with each other. An image recording apparatus of this invention includes an area information reception unit for acquiring area information broadcasted by an external apparatus such as a wireless base station or the like, and automatically acquires information associated with an area where the image recording apparatus is located. The apparatus records a sensed image signal and area information in association with each other.

22 Claims, 10 Drawing Sheets

FIG. 2

AREA INFORMATION 1

| ITEM | CONTENTS |
|---|---|
| PLACE NAME 1 | TOKYO |
| PLACE NAME 2 | AQUARIUM |
| PLACE NAME 3 | STAGE |
| WEATHER | FINE |
| TEMPERATURE | 10° C |
| EVENT | DOLPHIN SHOW |
| URL 1 | http://www.suizokukann.co.jp |
| URL 2 | http://www.suizokukann.co.jp/iruka_syou.htm |

FIG. 3

AREA INFORMATION METADATA 1

| ITEM | | CONTENTS |
|---|---|---|
| PERIOD INFORMATION | START TIME | 0 : 00 : 00 |
| | END TIME | 0 : 10 : 00 |
| THUMBNAIL | | Thumb 1 |
| AREA INFORMATION | PLACE NAME 1 | TOKYO |
| | PLACE NAME 2 | AQUARIUM |
| | PLACE NAME 3 | STAGE |
| | WEATHER | FINE |
| | TEMPERATURE | 10°C |
| | EVENT | DOLPHIN SHOW |
| | URL 1 | http://www.suizokukann.co.jp |
| | URL 2 | http://www.suizokukann.co.jp/iruka_syou.htm |

(1) AREA INFORMATION 1 ACQUIRED (0:00:00)
(2) AREA INFORMATION 2 ACQUIRED (0:10:00)
(3) AREA INFORMATION 3 ACQUIRED (0:30:00)

FIG. 6A

AREA INFORMATION 2

| ITEM | CONTENTS |
|---|---|
| PLACE NAME 1 | TOKYO |
| PLACE NAME 2 | AQUARIUM |
| PLACE NAME 3 | STAGE |
| WEATHER | CLOUDY |
| TEMPERATURE | 12° C |
| EVENT | SEALION SHOW |
| URL 1 | http://www.suizokukann.co.jp |
| URL 2 | http://www.suizokukann.co.jp/ashika_syou.htm |

FIG. 6B

AREA INFORMATION 3

| ITEM | CONTENTS |
|---|---|
| PLACE NAME 1 | TOKYO |
| PLACE NAME 2 | AQUARIUM |
| PLACE NAME 3 | SHARKS' TANK |
| WEATHER | FINE |
| TEMPERATURE | 14° C |
| URL 1 | http://www.suizokukann.co.jp |
| URL 2 | http://www.suizokukann.co.jp/same.htm |

FIG. 7A

AREA INFORMATION METADATA 2

| ITEM | | CONTENTS |
|---|---|---|
| PERIOD INFORMATION | START TIME | 0:10:00 |
| | END TIME | 0:30:00 |
| THUMBNAIL | | Thumb 2 |
| AREA INFORMATION | PLACE NAME 1 | TOKYO |
| | PLACE NAME 2 | AQUARIUM |
| | PLACE NAME 3 | STAGE |
| | WEATHER | CLOUDY |
| | TEMPERATURE | 12°C |
| | EVENT | SEALION SHOW |
| | URL 1 | http://www.suizokukann.co.jp |
| | URL 2 | http://www.suizokukann.co.jp/ashika_syou.htm |

FIG. 7B

AREA INFORMATION METADATA 3

| ITEM | | CONTENTS |
|---|---|---|
| PERIOD INFORMATION | START TIME | 0:30:00 |
| | END TIME | 1:00:00 |
| THUMBNAIL | | Thumb 3 |
| AREA INFORMATION | PLACE NAME 1 | TOKYO |
| | PLACE NAME 2 | AQUARIUM |
| | PLACE NAME 3 | SHARKS' TANK |
| | WEATHER | FINE |
| | TEMPERATURE | 14°C |
| | URL 1 | http://www.suizokukann.co.jp |
| | URL 2 | http://www.suizokukann.co.jp/same.htm |

IMAGE RECORDING APPARATUS CAPABLE OF RECORDING INFORMATION ASSOCIATED WITH LOCATION UPON IMAGE SENSING TOGETHER WITH SENSED IMAGE DATA, AND CONTROL METHOD THEREOF

FIELD OF THE INVENTION

The present invention relates to an image recording apparatus and, more particularly, to an image recording apparatus which can record information associated with a location upon image sensing together with sensed image data.

BACKGROUND OF THE INVENTION

In recent years, apparatuses such as digital still cameras, digital video cameras, and the like, which record digital image data of moving and still images have prevailed.

Digital still cameras popularly adopt compact memory cards as recording media, and some cameras can record not only still image data but also moving image data. Also, some digital video cameras adopt randomly accessible recording media such as compact memory cards, magnetooptical disks, and the like as recording media.

In cameras that use randomly accessible recording media, image data is saved as a data file. In this case, it is a common practice to record date information of an image sensing time together with image data. In recent years, some digital still cameras and digital video cameras record location information of an image sensing place together with image data by utilizing a positioning system such as GPS or the like. The location information includes, e.g., latitude information and longitude information. Japanese Patent Laid-Open No. 10-254746 discloses a technique for managing image data based on information of image sensing places.

As means for making active use of the location information recorded together with image data, it is a common practice to use a database that records location information, place name information, and the like. Upon searching the database on the basis of the location information (latitude and longitude) recorded together with image data, a place name and map information corresponding to that location information can be acquired.

A player of image data itself may have such database or a database provided as a service on a network such as the Internet or the like may be used via a player.

However, when the latitude and longitude are recorded as location information together with image data, it is difficult for the user to understand such information as they are. For this reason, in order to make active use of the location information, a database used to acquire information such as a map, actual place name, and the like that the user can easily understand on the basis of the location information is required.

Since the database stores place name information and the like in correspondence with location information, the data size is very large. When the player itself has the database, a large-capacity storage device is required.

Alternatively, a database on the network may be used without arranging any database in the player. In such case, in an environment in which the player cannot establish a connection to the network, the database cannot be used, and the location information cannot be actively used.

In this way, when only the location information is recorded together with image data, it is not always easy to make active use of the location information.

Also, when the conventional database is used, information depending on time such as event information cannot be acquired.

SUMMARY OF THE INVENTION

The present invention has been made in consideration of the conventional problems, and has as its object to allow an image recording apparatus, which records location information associated with an image sensing location of a sensed image in correspondence with the sensed image, to automatically record the location information that the user can understand.

According to an aspect of the present invention, a recording apparatus for recording an image signal comprising: image sensing means; area information acquisition means for receiving area information associated with a predetermined area including a current location of the recording apparatus from an external apparatus; and recording means for recording a moving image signal obtained by the image sensing means and the area information acquired by the area information acquisition means in a recording medium in association with each other.

According to another aspect of the present invention, a recording apparatus for recording an image signal comprising: an image sensor; area information acquisition means which receives, from an external apparatus, an area information associated with a predetermined area including a current location of the recording apparatus; and recording means which generates an image file containing an image signal obtained by the image sensor and the area information obtained by the area information acquisition means and records the image file on a recording medium.

According to further aspect of the present invention, a control method of a recording apparatus for recording an image signal, comprising: an image sensing step; an area information acquisition step of receiving area information associated with a predetermined area including a current location of the recording apparatus from an external apparatus; and a recording step of recording a moving image signal obtained in the image sensing step and the area information acquired in the area information acquisition step in a recording medium in association with each other.

According to another aspect of the present invention, a control method of a recording apparatus for recording an image signal comprising: an image sensing step; an area information acquisition step of receiving, from an external apparatus, an area information associated with a predetermined area including a current location of the recording apparatus; a recording step of generating an image file containing an image signal obtained by the image sensing step and the area information obtained by the area information acquisition step and recording the image file on a recording medium.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 shows the configuration of area information;

FIG. 3 shows the configuration of area information metadata;

FIGS. 6A and 6B show the configuration of area information;

FIGS. 7A and 7B show the configuration of area information metadata;

DETAILED DESCRIPTION OF THE PREFERRED EMBODIMENTS

Preferred embodiments of the present invention will now be described in detail in accordance with the accompanying drawings. Note that the following embodiments will exemplify an image recording/playback apparatus to which the present invention is applied. However, an image recording apparatus according to the present invention need not have any playback function.

First Embodiment

Figure 1:
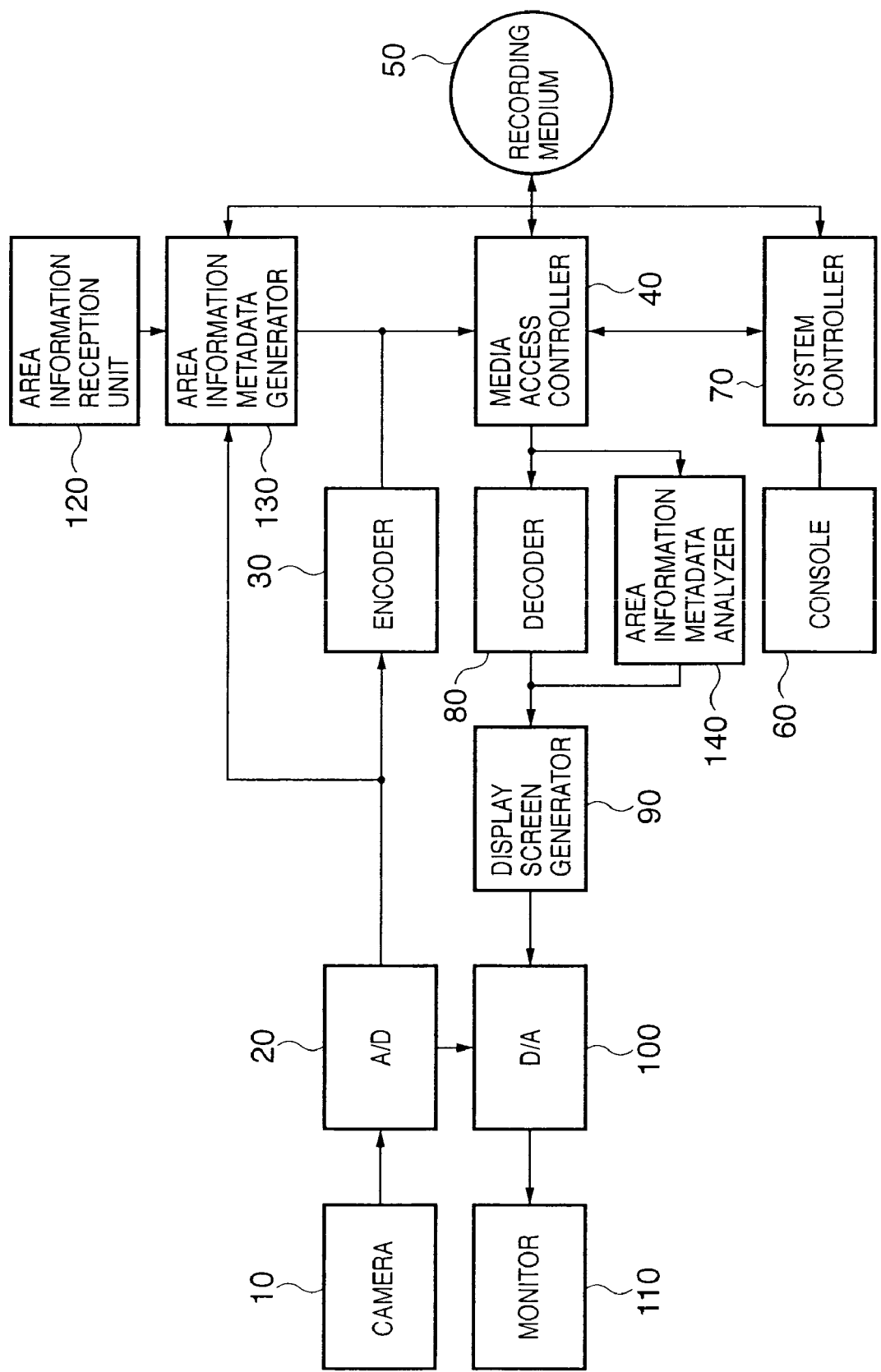
FIG. 1 is a block diagram showing an example of the arrangement of an image recording/playback apparatus according to the first embodiment of the present invention.

FIG. 1 is a block diagram showing an example of the arrangement of an image recording/playback apparatus according to the first embodiment of the present invention.

Referring to FIG. 1, reference numeral 10 denotes an image sensing unit (camera) for converting an optical image of an object into an electrical signal. Reference numeral 20 denotes an analog-to-digital (A/D) converter. Reference numeral 30 denotes an encoder having a function of compression-encoding digital image data (by, e.g., JPEG, GIF, DV, MPEG, and the like). Reference numeral 40 denotes a media access controller for exchanging data with a recording medium 50. Reference numeral 50 denotes a randomly accessible recording medium, which records digital data such as moving image data, still image data, play list data, and the like as data files. Reference numeral 60 denotes a console which includes a control panel having buttons and keys, a remote controller, and the like. Reference numeral 70 denotes a system controller which controls the operation of the overall apparatus, and comprises a microcomputer. Reference numeral 80 denotes a decoder having a function of decoding compression-encoded digital data. Reference numeral 90 denotes a display screen generator for generating a screen image to be displayed on a monitor 110. Reference numeral 100 denotes a digital-to-analog (D/A) converter. Reference numeral 110 denotes a monitor serving as a display unit. Reference numeral 120 denotes a reception unit for acquiring area information from a wireless base station. Reference numeral 130 denotes an area information metadata generator for generating area information metadata.

The operation of the image recording/playback apparatus shown in FIG. 1 will be described below. The image recording/playback apparatus of this embodiment has two modes, e.g., recording and playback modes of image data. In the recording mode, area information of an image sensing place is automatically recorded as metadata upon recording image data. In this embodiment, a wireless base station is used to acquire area information. Hence, a recording/playback apparatus that can communicate with such wireless base station will be exemplified below. However, the recording/playback apparatus itself may not have any means for communicating with the wireless base station, and may acquire area information using another device which can communicate with the wireless base station. In this case, the image recording/playback apparatus has interface means used to connect another device which can communicate with the wireless base station.

As the wireless base station used in this embodiment, those used in wireless communication systems that use portable wireless communication terminals (to be simply referred to as portable terminals hereinafter) such as a portable phone, PHS, and the like may be commonly used. Of course, a dedicated wireless base station may be used in addition to or in place of these existing wireless base stations. Furthermore, other wireless techniques, e.g., a wireless LAN, Bluetooth, and the like may be used to acquire area information.

Note that a moving image will be exemplified as an image to be recorded/played back. However, the present invention can be similarly applied to recording/playback of a still image.

(Operation in Recording Mode)

The operation in the recording mode will be described first.

The camera 10 converts an optical image of an object into an electrical signal, and supplies the electrical signal to the A/D converter 20. The A/D converter 20 converts the electrical signal received from the camera 10 into digital image data, and supplies the digital image data to the encoder 30, D/A converter 100, and area information metadata generator 130.

The encoder 30 executes a process for compressing the data size of the digital image data (compression encoding), and passes the compressed image data to the media access controller 40. Note that the image data is compressed by a general method such as MPEG or the like.

The console 60 serves as a user interface of the image recording/playback apparatus. The user operates the console 60 to input an image data recording instruction, stop instruction, and the like. The console 60 sends operation instruction commands to the system controller 70 in accordance with these instructions. For example, when the user has made a recording operation, the console 60 transmits a recording instruction command to the system controller 70. On the other hand, when the user has made a stop operation, the console 60 transmits a stop instruction command to the system controller 70. The user can switch the operation mode between the recording mode and playback mode on the console 60.

The system controller 70 controls the operation of the overall apparatus, and executes processes such as control of the media access controller 40, control of the area information metadata generator 130, and the like upon reception of the instructions from the console 60. Upon receiving the recording instruction command from the console 60, the system controller 70 sends an image data recording start command to the media access controller 40 to save an image sensed by the camera 10, and also to the area information metadata generator 130 to record area information. Also, upon receiving the stop instruction command from the console 60, the system controller 70 sends a recording stop command to the media access controller 40, and also to the area information metadata generator 130.

The system controller 70 measures a recording time from the beginning of image data recording, and transmits the measured recording time upon reception of a recording time acquisition command from the area information metadata generator 130.

Upon reception of the image data recording start command from the system controller 70, the media access controller 40 records image data received from the encoder 30 at that time on the recording medium 50 as an image data file.

Upon reception of the recording stop command from the system controller 70 during the image data recording process, the media access controller 40 ends the recording process.

The area information reception unit 120 periodically or continuously monitors a broadcast channel of a wireless base station (not shown), and automatically receives area information broadcasted by the wireless base station. Upon reception of the area information, the reception unit 120 sends that area information to the area information metadata generator 130. When a communication with the wireless base station is disabled, the area information reception unit 120 sends communication disabled information to the area information metadata generator 130.

Acquisition of area information using a portable terminal will be briefly explained below.

A portable terminal frequency communicates with a nearby wireless base station even in a non-conversation state. By sending an identification number (e.g., telephone number) unique to the terminal to the wireless base station during this communication, information indicating the service area of a wireless base station in which that terminal is currently located is registered in a supervising station that supervises respective wireless base stations, and this registration information can be used by other wireless base stations. For example, when a phone call is made to a given portable terminal, the supervising station searches for a wireless base station which currently provides a service to that terminal on the basis of the telephone number of the terminal, and connects a line to that wireless base station, thus allowing conversation. In this way, since the portable terminal is always associated with a specific wireless base station, the current location of the portable terminal is roughly determined based on the location of that wireless base station.

The portable terminal is used in various information communications in addition to conversation. Each wireless base station broadcasts area information unique an area where the base station is located by push information broadcasting. The area information to be broadcasted includes location information, a place name, weather, temperature, event information, advertisement, and the like. Push information broadcasting can obviate the need for any special troublesome user's operations to acquire area information, and the portable terminal can automatically acquire the area information. For example, by exploiting push information broadcasting, even when a wireless terminal has moved to another area, it can automatically acquire area information from a new wireless base station. Also, even when the wireless terminal stops over a given place, it can automatically acquire new area information when, e.g., a new event has started.

FIG. 2 shows an example of the area information. The area information shown in FIG. 2 includes "place name, weather, temperature, event, and URL" fields. Furthermore, in this example, the area information includes a plurality of place name fields and URL information fields. By preparing a plurality of fields, a larger number of pieces of information can be used for a single item. As for a place name, since different place name ranges are often required depending on the purposes, the area information can describe place names corresponding to a plurality of areas. Note that the area information shown in FIG. 2 is merely an example, and may include other kinds of information.

Upon reception of area information from the area information reception unit 120, the area information metadata generator 130 saves the area information in an internal memory (not shown). Also, upon reception of communication disabled information from the area information reception unit 120, the area information metadata generator 130 clears the area information from the internal memory.

The area information metadata generator 130 receives the recording start/stop command and recording time from the system controller 70, and executes a process associated with recording of area information metadata. FIG. 3 shows an example of the configuration of the area information metadata.

The area information metadata includes three items, i.e., period information, thumbnail data, and area information, as shown in FIG. 3. The period information includes start and end times, and is used as information indicating a time band of moving image data, which is associated with the area information. In this case, the start and end times have [hour: minute:second] data, but may have more detailed time data. The area information has the configuration shown in FIG. 2, and includes "place name, weather, temperature, event, and URL" information. The thumbnail data includes thumbnail URL image data. FIG. 3 describes Thumb1 for the sake of simplicity, but thumbnail image data is recorded in practice.

The area information metadata of this embodiment is recorded in the form of a header or footer of image data itself. The operation of the area information metadata generator 130 will be described in detail later using a flow chart.

The D/A converter 100 D/A-converts data received from the A/D converter 20. The monitor 110 displays an analog image signal supplied from the D/A converter 100. With this process, an image which is being sensed is displayed on the monitor. The D/A converter 100 D/A-converts image data played back from the recording medium 50 in the playback mode, and outputs an analog image signal to the monitor 110.

With this arrangement, an image sensed by the camera can be recorded as a file with metadata in the recording mode.

The area information recording process will be described in detail below using the flow chart of FIG. 4.

Figure 4:
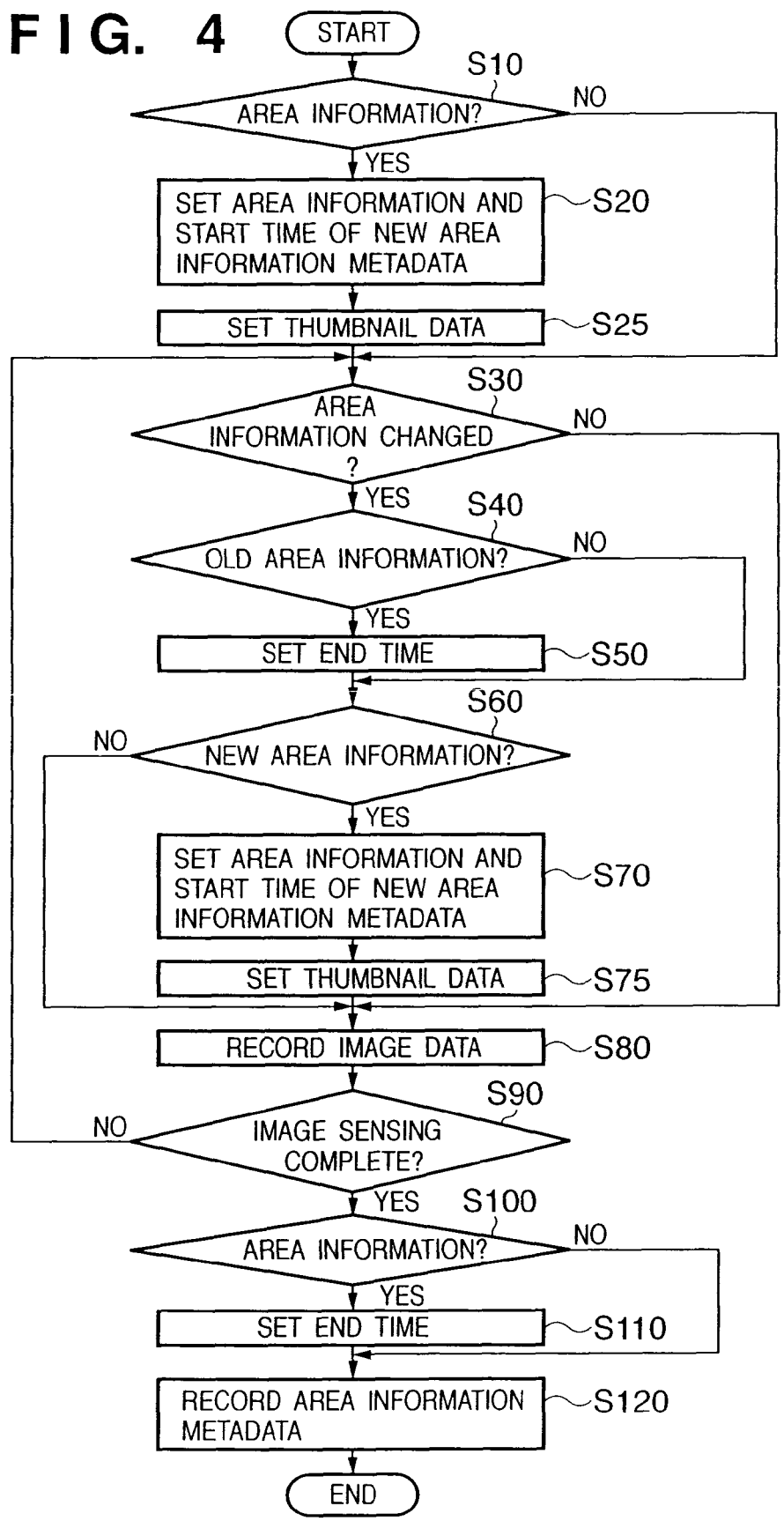
FIG. 4 is a flow chart for explaining an area information metadata generation process in the first embodiment.

The flow chart of FIG. 4 shows a process executed in response to an image data recording instruction from the console 60 shown in FIG. 1.

It is checked in step S10 if the area information of the current area has already been received when the area information metadata generator 130 receives a recording start command from the system controller 70. If the area information is saved in the internal memory of the area information metadata generator 130, it is determined that the area information has already been received, and the flow advances to step S20 in FIG. 4. On the other hand, if no area information is saved in the internal memory, it is determined that the area information has not been received, and the flow jumps to step S30.

In step S20, area information metadata is generated. Upon generating the area information metadata, the area information in the memory is used as area information, and the start time of the period information is set to zero. This means the head of moving image data to be recorded. Since the end time of the period information is not determined at this time, it is temporarily set in correspondence with the start time.

In step S25, image data is acquired from the A/D converter 20, and undergoes a reduction process to generate thumbnail image data corresponding to the start time. After that, the generated thumbnail image data is set as thumbnail data of the area information metadata. In this case, the thumbnail data is generated based on sensed image data. If the area information contains image data, thumbnail data may be generated based on that image data.

Steps S30 to S90 form a processing loop during image data recording.

It is checked in step S30 if the area information is changed. The area information may be changed, e.g., when one of the following conditions is met:
(1) when new area information is received since the terminal has moved to an area of another wireless base station;
(2) when new area information is received in an identical wireless base station area;
(3) when a communication with the wireless base station is disabled, and area information can no longer be acquired; and
(4) when the communication disabled state with the wireless base station has changed to a communication enabled state, and area information can be acquired.

If it is determined in step S30 that the area information is changed, the flow advances to step S40; otherwise, the flow jumps to step S80.

It is checked in step S40 if another area information is held before the area information is changed, i.e., if one of the area information change conditions (1), (2), and (3) is met. If the area information is held previously, the flow advances to step S50; otherwise, the flow jumps to step S60.

In step S50, the end time of the area information metadata is set. The system controller 70 in FIG. 1 measures the recording time from the beginning of recording of image data. When the area information is changed, the area information metadata generator 130 acquires that recording time by sending a recording acquisition command to the system controller 70, and sets that value as the end time in step S50. Upon setting the end time, the generation process of one area information metadata ends. The generated area information metadata is saved in the internal memory until a process for appending the metadata to moving image data is executed. When a plurality of pieces of area information are acquired, a plurality of area information metadata are generated and saved in the internal memory.

It is checked in step S60 if new area information is available upon changing the area information, i.e., if one of the area information change conditions (1), (2), and (4) is met. If new area information is available, the flow advances to step S70; otherwise (if the condition (3) is met), the flow jumps to step S80.

The flow advances to step S70 when new area information is available after the area information is changed, i.e., when one of the area information change conditions (1), (2), and (4) is met. In step S70, new area information metadata is generated. The newly acquired area information is set as area information. As the period information, a recording time acquisition command is sent to the system controller 70 to acquire the recording time, and that value is set as the start time. Since the end time of the period information is not determined at that time, it is temporarily set in correspondence with the start time.

In step S75, image data is acquired from the A/D converter 20 and undergoes a reduction process to generate thumbnail image data for the new area information metadata. After that, the generated thumbnail image data is set as thumbnail data of the new area information metadata.

In step S80, an image data recording process is executed. Image data is recorded on the recording medium 50 in FIG. 1.

It is checked in step S90 if the image sensing operation is complete. When the user issues a recording stop instruction by operating the console 60, a stop command is sent to the area information metadata generator 130 via the system controller 70. Upon reception of the stop command, the flow advances to step S100; otherwise, the flow returns to step S30.

It is checked in step S100 if area information is available at the end of recording of image data. If the area information is available, the flow advances to step S110; otherwise, the flow jumps to step S120.

In step S110, the end time of the area information metadata at the end of recording of image data is set. The area information metadata generator 130 acquires the recording time by sending a recording time acquisition command to the system controller 70 upon reception of the stop command, and sets that value as the end time in step S110.

In step S120, a process for appending all area information metadata which are generated in steps S10 to S110 and are saved in the internal memory to the recorded image data is executed. If a plurality of area information metadata are saved in the internal memory, they are appended to the recorded image data. The area information metadata is recorded in the form of the header or footer of the image data. In this embodiment, all items of area information are recorded. However, the user may select items to be recorded from the area information.

With this process, a plurality of area information metadata can be recorded in moving image data without any repetitive period information.

A generation process of period information metadata will be explained below using a schematic view of FIG. 5.

Figure 5:
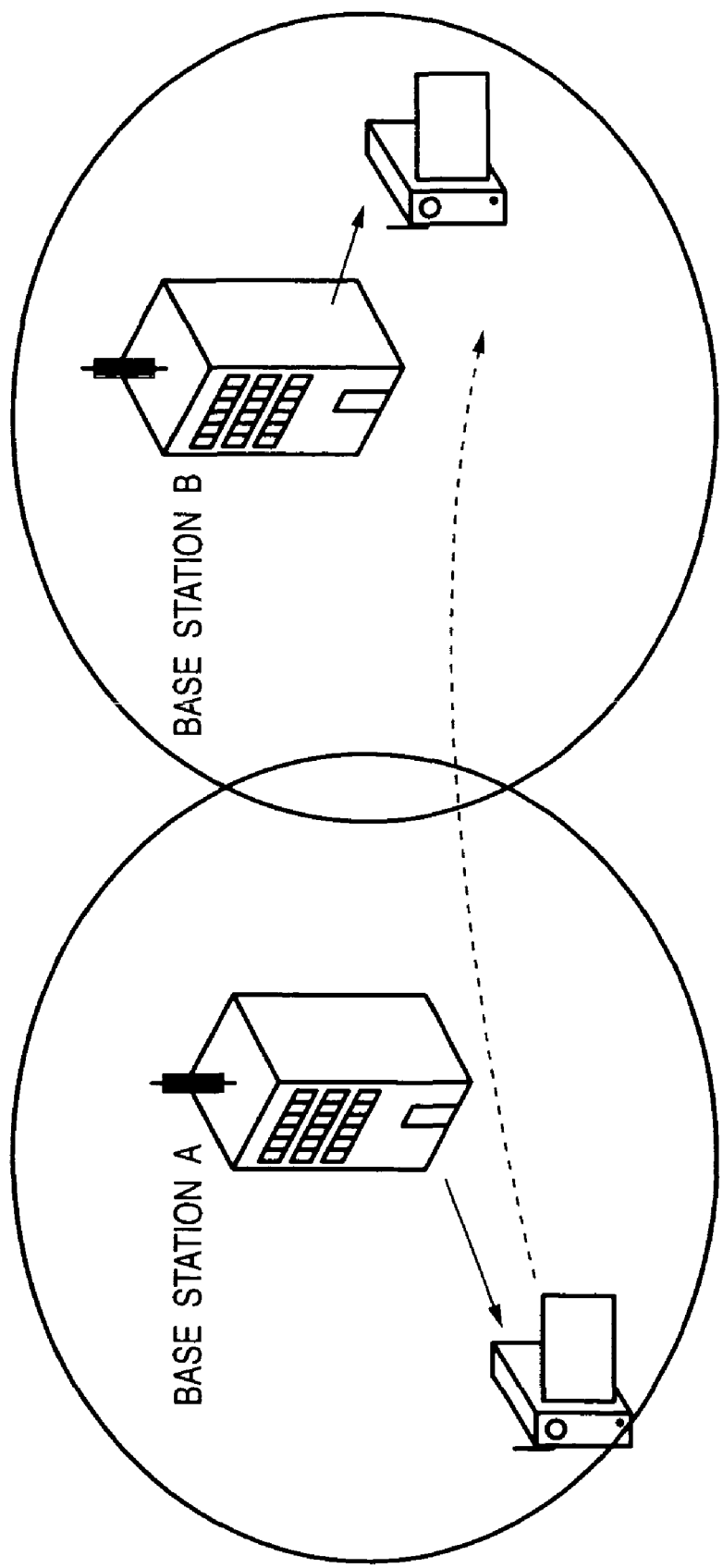
FIG. 5 is a schematic view for giving an explanation about acquisition of area information.

FIG. 5 shows an example wherein the user senses images while moving from the area of base station A to that of base station B. In this example, assume that the user starts image sensing at time (0:00:00) in the area of base station A, acquires area information 1 broadcasted by base station A there, acquires another area information 2 from base station A 10 minutes after the first acquisition (0:10:00), moves to the area of base station B 30 minutes after the beginning of image sensing (0:30:00), and acquires area information 3 broadcasted by base station B. As examples of area information to be acquired, FIG. 2 shows area information 1, and FIGS. 6A and 6B show area information 2 and area information 3.

In this example, the image sensing place is the Aquarium: especially, the area of base station A includes a stage of the aquarium, and the area of base station B includes a sharks' tank. Since events are periodically held on the stage, event information of a dolphin show shown in FIG. 2 is broadcasted. Since events are updated on the stage depending on the time, when the next event begins, new area information is broadcasted. In this case, since a sealion show begins after the dolphin show, that event information is broadcasted as area information 2. In this case, area information 2 is acquired 10 minutes after the beginning of image sensing.

After that, since the user moves from the area of base station A to the sharks' tank in the area of base station B while sensing images, area information 3 broadcasted by base station B is acquired. Since no event is held in the area of base station B, the area information does not contain any event information. In this case, area information 3 is acquired 30 minutes after the beginning of image sensing.

FIG. 3 and FIGS. 7A and 7B respectively show area information metadata generated based on the area information shown in FIG. 2 and FIGS. 6A and 6B. FIG. 3 shows the area information metadata of area information 1. FIG. 7A shows the area information metadata of area information 2, and FIG. 7B shows that of area information 3. In this way, by appending period information and thumbnail data to the previously acquired area information, area information metadata is generated.

By appending these area information metadata to moving image data, they are recorded as metadata having period information without any repetitive area information. Upon changing area information, a new thumbnail image is appended.

The operation in the recording mode has been explained.

(Operation in Playback Mode)

The operation in the playback mode of the image recording/playback apparatus according to this embodiment will be described below.

When the user issues a switching instruction to the playback mode using the console 60, the system controller 70 switches the image recording/playback apparatus to the playback mode. In the playback mode, the user can make operations such as a play operation, stop operation, and the like on the console 60, and the console 60 sends operation instruction commands to the system controller 70 in accordance with these operations. For example, when the user has made a play operation, the console 60 sends a play instruction command to the system controller 70. On the other hand, when the user has made a stop operation, the console 60 sends a stop instruction command to the system controller 70.

Upon reception of the play instruction command, the system controller 70 sends a play command to the media access controller 40 to execute a playback process of image data to be played back.

Upon acquisition of the play command, the media access controller 40 reads image data from the recording medium 50, and sends it to the decoder 80.

The decoder 80 decodes image data received from the media access controller 40, and passes the decoded data to the display screen generator 90.

At this time, an area information metadata analyzer 140 acquires area information metadata of the image data via the media access controller 40, and sends the area information metadata to the display screen generator 90 on the basis of the period information.

The display screen generator 90 generates a display screen on the basis of the decoded image data sent from the decoder 80, and the area information metadata received from the area information metadata analyzer 140. The display screen generator 90 generates display screen data to display area information corresponding to image data to be displayed on the basis of the period information in the area information metadata received from the area information metadata analyzer 140. For example, when image data that records the area information explained using FIG. 5 is to be played back, the display screen data is generated using data of area information 1 for first 10 minutes from the beginning of playback, data of area information 2 for next 20 minutes (from 0:10:00 to 0:30:00), and data of area information 3 for the next 30 minutes (from 0:30:00 to 1:00:00).

After the display screen data is generated, the display screen generator 90 sends the generated display screen data to the D/A converter 100.

The D/A converter 100 converts image data received from the display screen generator 90 into an analog signal, and sends it to the monitor 110, thus displaying an image.

Figure 8:
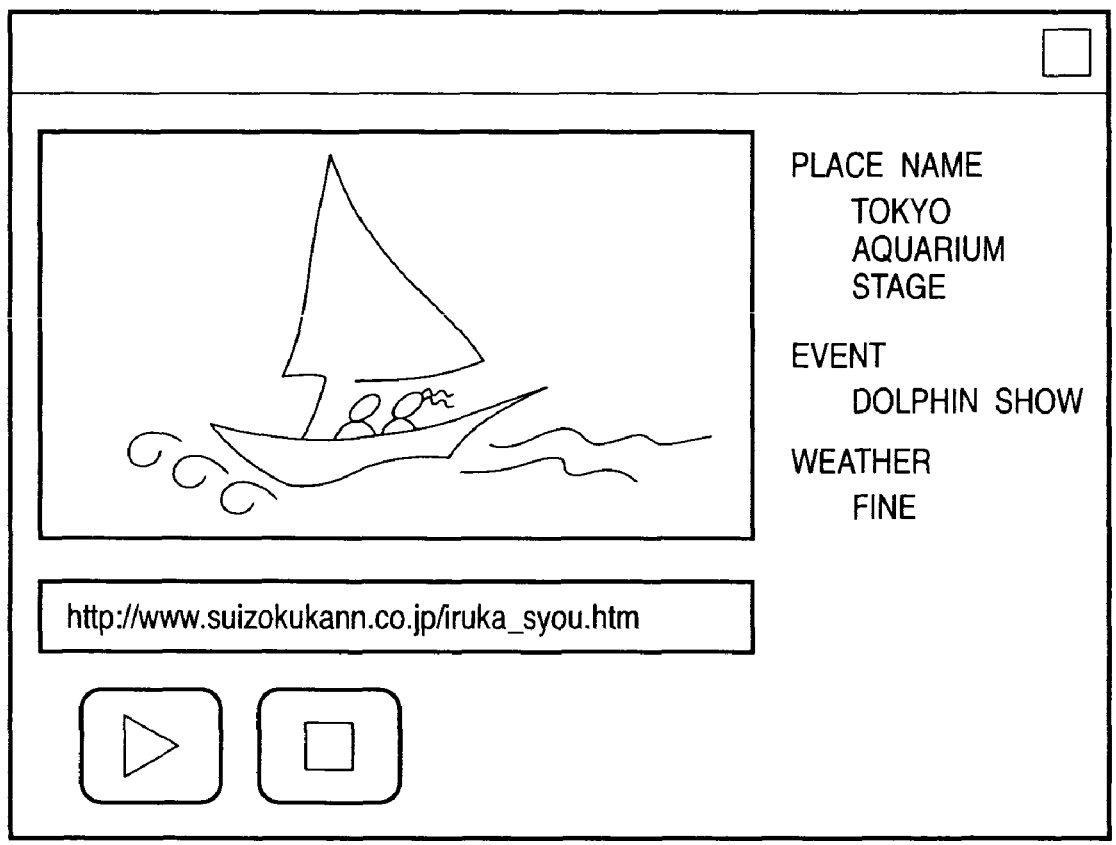
FIG. 8 shows an example of a playback window.

By repeating the above operations, a moving image is displayed on the monitor 110. FIG. 8 shows an example of the playback screen. As shown in FIG. 8, this embodiment displays image data and area information together. In this example, the place name, event, and weather information are displayed as area information on the right side of image data, and a URL is displayed under the image data. Of course, all items of the recorded area information may be displayed, or fewer items may be displayed. Furthermore, other arbitrary layouts may be used.

In addition to the playback screen shown in FIG. 8, another display method may be adopted. For example, when the user has made an operation, area information corresponding to that timing may be displayed. When the image recording/playback apparatus can establish connection to a computer network such as the Internet or the like, the user may connect a given site by selecting the URL of the area information displayed on the playback screen.

With this arrangement, area information such as a place name, event, and the like corresponding to the image sensing place and time can be automatically recorded as metadata of moving image data. When new area information is acquired, it is recorded as another area information on the recording medium. Hence, even when the user senses images while moving from a given place to another, area information corresponding to the image sensing place is always recorded. Since thumbnail data are recorded in respective area information metadata, they can be used to search for titles or scenes.

Furthermore, since the area information to be recorded is easy to understand for the user, the user can utilize such information in the playback mode.

Second Embodiment

Figure 9:
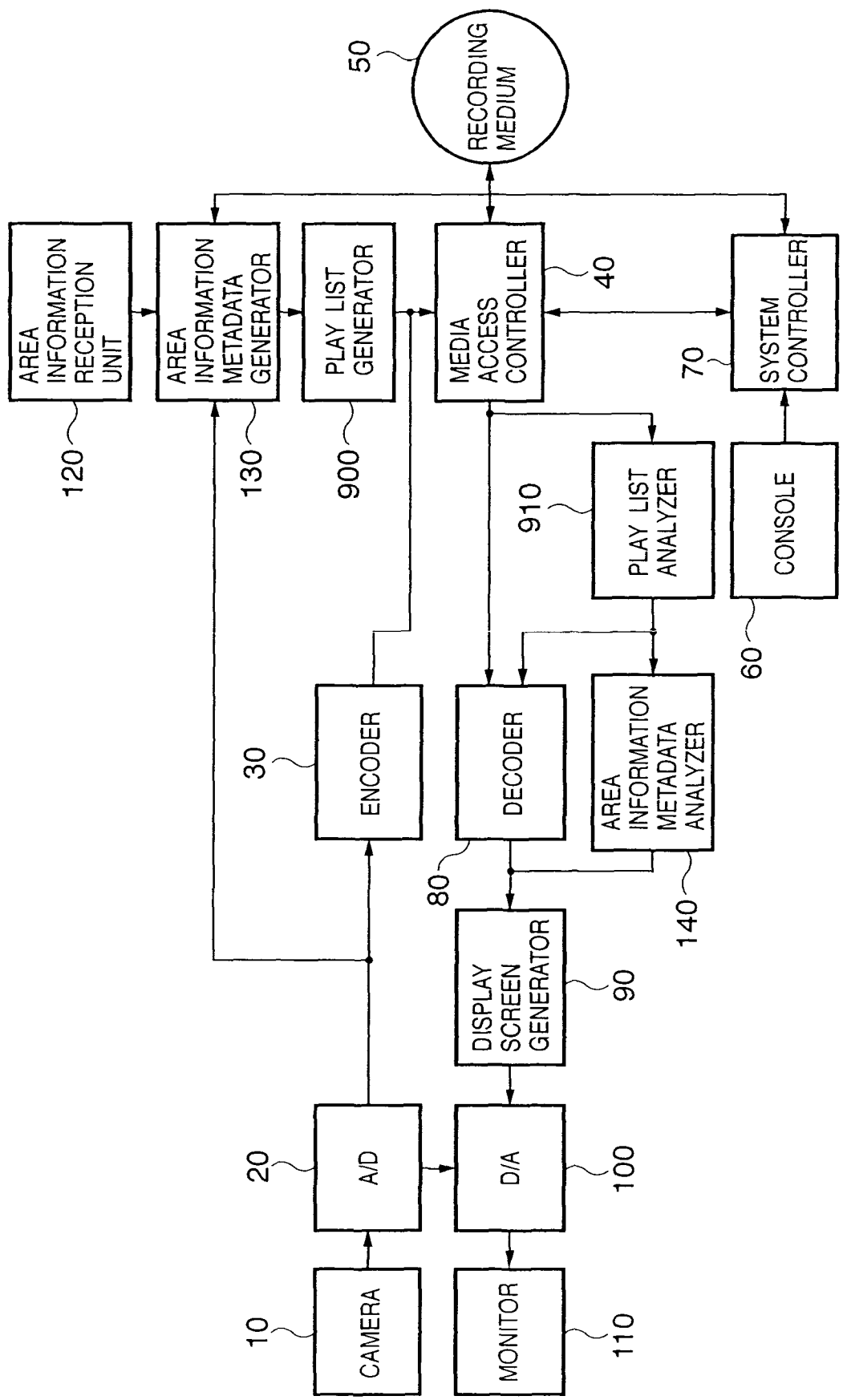
FIG. 9 is a block diagram showing an example of the arrangement of an image recording/playback apparatus according to the second embodiment of the present invention.

FIG. 9 is a block diagram showing an example of the arrangement of an image recording/playback apparatus according to the second embodiment of the present invention. The image recording/playback apparatus of the first embodiment appends area information to image data itself. However, the image recording/playback apparatus of this embodiment records area information as a file independent from image data.

In FIG. 9, since components 10 to 140 are the same as those in FIG. 1, a description thereof will be omitted by denoting them using the same reference numerals. In FIG. 9, reference numeral 900 denotes a play list generator; and 910, a play list analyzer.

The operation of the image recording/playback apparatus in FIG. 9 will be described below. The image recording/playback apparatus of this embodiment has two modes, e.g., recording and playback modes of moving image data. In the recording mode, a play list that contains area information of the image sensing place is automatically recorded upon recording moving image data.

The play list can record the playback position, playback time, playback order, and the like of image data. In this embodiment, the play list can further record area information metadata. In this embodiment as well, wireless base stations of portable terminals such as a portable phone, PHS, and the like are used as in the first embodiment. Furthermore, this embodiment will exemplify a recording/layback apparatus which can communicate with a wireless base station. Alternatively, the image recording/layback apparatus may communicate with the wireless base station via a portable terminal connected to it.

The operation in the recording mode will be explained first.

The camera 10 converts an optical image of an object into an electrical signal, and supplies the electrical signal to the A/D converter 20. The A/D converter 20 converts the electrical signal received from the camera 10 into digital image data, and supplies the digital image data to the encoder 30, D/A converter 100, and area information metadata generator 130.

The encoder 30 executes a process for compressing the data size of the digital image data (compression encoding), and passes the compressed image data to the media access controller 40. Note that the image data is compressed by a general method such as MPEG or the like.

The console 60 serves as a user interface of the image recording/playback apparatus. The user operates the console 60 to input an image data recording instruction, stop instruction, and the like. The console 60 sends operation instruction commands to the system controller 70 in accordance with these instructions. For example, when the user has made a recording operation, the console 60 transmits a recording instruction command to the system controller 70. On the other hand, when the user has made a stop operation, the console 60 transmits a stop instruction command to the system controller 70. The user can switch the operation mode between the recording mode and playback mode on the console 60.

The system controller 70 controls the operation of the overall apparatus, and executes processes such as control of the media access controller 40, control of the area information metadata generator 130, and the like upon reception of the instructions from the console 60. Upon receiving the recording instruction command from the console 60, the system controller 70 sends an image data recording start command to the media access controller 40 to save an image sensed by the camera 10, and also to the area information metadata generator 130 to record area information. At this time, the system controller 70 sends a file name of the image data to be recorded to the play list generator 900.

On the other hand, upon receiving the stop instruction command from the console 60, the system controller 70 sends a recording stop command to the media access controller 40, and also to the area information metadata generator 130.

The system controller 70 measures a recording time from the beginning of image data recording, and transmits the measured recording time upon reception of a recording time acquisition command from the area information metadata generator 130.

Upon reception of the image data recording start command from the system controller 70, the media access controller 40 records image data received from the encoder 30 at that time on the recording medium 50 as an image data file.

Upon reception of the recording stop command from the system controller 70 during the image data recording process, the media access controller 40 ends the recording process.

The area information reception unit 120 can automatically receive area information broadcasted by a wireless base station (not shown). Upon reception of the area information, the reception unit 120 sends that area information to the area information metadata generator 130. When a communication with the wireless base station is disabled, the area information reception unit 120 sends communication disabled information to the area information metadata generator 130.

Upon reception of area information from the area information reception unit 120, the area information metadata generator 130 saves the area information in an internal memory (not shown). Also, upon reception of communication disabled information from the area information reception unit 120, the area information metadata generator 130 clears the area information from the internal memory.

The area information metadata generator 130 receives the recording start command, recording stop command, and recording time from the system controller 70, and executes a process associated with generation of area information metadata. Note that the structure of the area information metadata is the same as that in the first embodiment.

Furthermore, the same area information metadata generation process as that explained using the flow chart of FIG. 4 in the first embodiment is executed. In this embodiment, since the area information metadata is recorded as metadata of a play list file independent from moving image data, a process for sending the generated area information metadata to the play list generator 900 is executed in place of the process for recording the area information metadata in the header or footer of the moving image data file. That is, the process for sending the area information metadata to the play list generator 900 is executed in place of the process for appending the area information metadata to moving image data to be recorded in step S120 in FIG. 4.

The play list generator 900 receives the file name of moving image data to be recorded from the system controller 70, and generates a play list which registers only that moving image data file. Normally, a play list describes the playback order of a plurality of moving image data files. However, the play list generated in this embodiment describes to play back only one moving image data file. The play list generator 900 does not generate any play list if no area information metadata is available.

Upon reception of the area information metadata from the area information metadata generator 130, the play list generator 900 executes a process for appending the area information metadata to the previously generated play list. After the play list appended with the area information metadata is generated, the play list generator 900 executes a process for recording the play list on the recording medium 50 via the media access controller 40.

The D/A converter 100 D/A-converts data received from the A/D converter 20. The monitor 110 displays an analog image signal supplied from the D/A converter 100. With this process, an image which is being sensed is displayed on the monitor.

With this arrangement, upon recording moving image data, a play list file which is associated with the recorded moving image data and is appended with the area information metadata can be automatically recorded.

The operation in the playback mode of the image recording/playback apparatus according to this embodiment will be described below.

When the user issues a switching instruction to the playback mode using the console 60, the system controller 70 switches the image recording/playback apparatus to the playback mode. In the playback mode, the user can make operations such as a play operation, stop operation, and the like on the console 60, and the console 60 sends operation instruction commands to the system controller 70 in accordance with these operations. For example, when the user has made a play operation, the console 60 sends a play instruction command to the system controller 70. On the other hand, when the user has made a stop operation, the console 60 sends a stop instruction command to the system controller 70.

Upon receiving the play instruction command, the system controller 70 sends a play command to the media access controller 40 in order to perform a playback process of data that is subjected to playback.

If a file to be played back is image data upon acquisition of the play command, the media access controller 40 reads image data from the recording medium 50, and sends it to the decoder 80. On the other hand, if a file to be played back is a play list upon acquisition of the play command, the media access controller 40 reads the play list from the recording medium 50, and sends it to the play list analyzer 910.

Upon reception of the play list data, the play list analyzer 910 executes a play list analysis process, and acquires the file name of moving image data registered in the play list. The play list analyzer 910 then reads image data with that file name from the recording medium 50 via the media access controller 40, and sends it to the decoder 80.

Also, the play list analyzer 910 sends area information metadata recorded in the play list to the area information metadata analyzer 140.

The area information metadata analyzer 140 acquires the area information metadata, and sends it to the display screen generator 90 on the basis of the period information.

The display screen generator 90 generates a display screen on the basis of the decoded image data sent from the decoder 80, and the area information metadata received from the area information metadata analyzer 140. The display screen generator 90 generates display screen data to display area information corresponding to image data to be displayed on the basis of the period information in the area information metadata received from the area information metadata analyzer 140.

After the display screen data is generated, the display screen generator 90 sends the generated display screen data to the D/A converter 100.

The D/A converter 100 converts image data received from the display screen generator 90 into an analog signal, and sends it to the monitor 110, thus displaying an image.

By repeating the above operations, a moving image is displayed on the monitor. The playback screen is displayed in the same manner as in the first embodiment.

With the above arrangement, area information such as a place name, event, and the like corresponding to the image sensing place and time can be automatically recorded as metadata of a play list associated with moving image data.

Since area information is recorded in a play list file independent from moving image data without being recorded in the moving image data file itself, the moving image data need not adopt any special format. For this reason, a player which cannot recognize the area information metadata can play back moving image data without any problem.

Furthermore, since the area information to be recorded is easy to understand for the user, the user can utilize such information in the playback mode.

In the above embodiment, only the recording and playback operations of a moving image have been explained. However, the present invention can be similarly applied to the recording and playback operations of a still image. In case of a still image, the start and end times indicate the same time. Also, unlike in the above embodiments, area information metadata which is saved in the internal memory of the area information metadata generator 130 upon image sensing is recorded together with image data (first embodiment) or in correspondence with image data (second embodiment).

Figure 10:
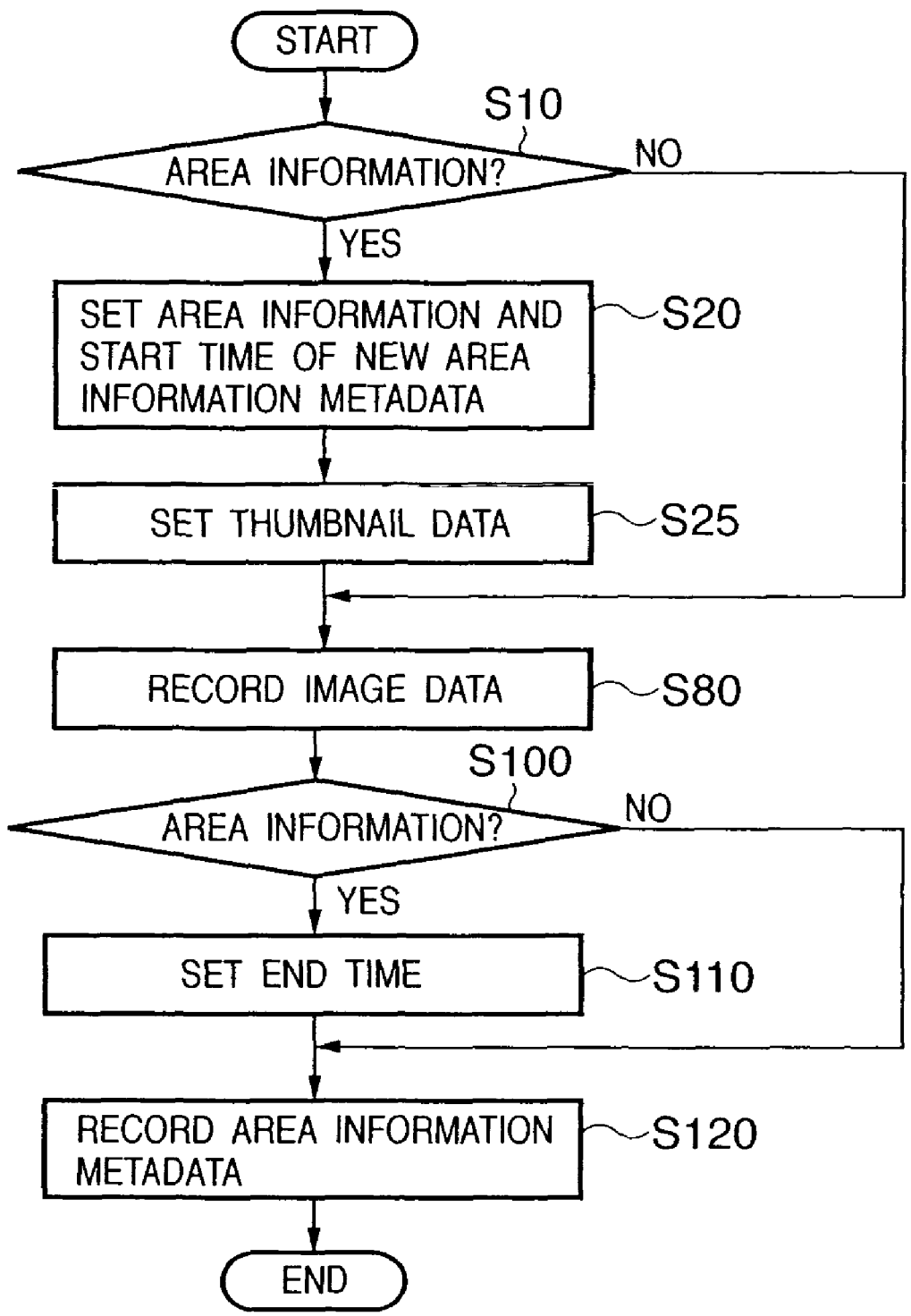
FIG. 10 is a flow chart for explaining a recording process upon sensing a still image.

More specifically, as shown in FIG. 10, after thumbnail data is set in step S25, an image is recorded in step S80. If area information is available, the same end time as the start time is set in step S110, and area information metadata is recorded in step S120. Note that the thumbnail data may be set after image data is recorded in step S80.

When a still image is sensed in the first embodiment, area information metadata is recorded as the header or footer of image data in step S120. On the other hand, when a still image is sensed in the second embodiment, a play list is generated, and is recorded in correspondence with a still image file in step S120.

In the above embodiments, only the image recording/playback apparatus consisting of a single device has been explained. However, equivalent functions may be implemented by a system consisting of a plurality of devices.

Note that the present invention includes a case wherein the equivalent functions are achieved by supplying a software program (a program corresponding to the flow chart shown in FIG. 4) that implements the functions of the aforementioned embodiments directly from a recording medium or using wired/wireless communications to a system or apparatus having a computer that can execute the program, and executing the supplied program by the computer of that system or apparatus.

Therefore, the program code itself supplied to and installed in the computer to implement the functional process of the present invention using the computer implements the present invention. That is, the present invention includes the computer program itself for implementing the functional process of the present invention.

In this case, the form of program is not particularly limited, and an object code, a program to be executed by an interpreter, script data to be supplied to an OS, and the like may be used as along as they have the program function.

As the recording medium for supplying the program, for example, magnetic recording media such as a flexible disk, hard disk, magnetic tape, and the like, optical/magnetooptical storage media such as MO, CD-ROM, CD-R, CD-RW, DVD-ROM, DVD-R, DVD-RW, and the like, nonvolatile semiconductor memory, and so forth may be used.

As a program supply method using the wired/wireless communications, a server on a computer network may store a data file (program data file) that can be a computer program which forms the present invention on a client computer, such as the computer program itself which forms the present invention, a compressed file including an automatic installation function, or the like, and the program data file may be downloaded to the client computer which establishes connection to the server. In this case, the program data file may be segmented into a plurality of segment files, which may be allocated on different servers.

That is, the present invention includes a server apparatus which makes a plurality of users download the program data file for implementing the functional process of the present invention on a computer.

Also, a storage medium such as a CD-ROM or the like, which stores the encrypted program of the present invention, may be delivered to the user, the user who has cleared a predetermined condition may be allowed to download key information that is used to decrypt the program from a home page via the Internet, and the encrypted program may be executed using that key information to be installed on a computer, thus implementing the present invention.

The functions of the aforementioned embodiments may be implemented not only by executing the readout program code by the computer but also by some or all of actual processing operations executed by an OS or the like running on the computer on the basis of an instruction of that program.

Furthermore, the functions of the aforementioned embodiments may be implemented by some or all of actual processes executed by a CPU or the like arranged in a function extension board or a function extension unit, which is inserted in or connected to the computer, after the program read out from the recording medium is written in a memory of the extension board or unit.

As described above, according to the present invention, an image recording apparatus, which records a sensed image and location information associated with the image sensing location of this image in correspondence with each other, can automatically record location information that the user can understand.

Furthermore, the present invention can be applied to the system comprising either a plurality of units or a single unit. It is needless to say that the present invention can be applied to the case which can be attained by supplying programs which execute the process defined by the present system or invention.

The present invention is not limited to the above embodiments and various changes and modifications can be made within the spirit and scope of the present invention. Therefore to apprise the public of the scope of the present invention, the following claims are made.

What is claimed is:

1. A recording apparatus for recording an image signal comprising:
   an image sensing unit constructed to sense an image of an object and generate a moving image signal, the moving image signal including two or more images;
   an information reception unit constructed to receive information from an external source;
   a memory constructed to save the information received by said information reception unit;
   a recording unit constructed to perform a plurality of successive record operations to continuously record the moving image signal continuously generated by said image sensing unit until the image sensing unit completes image sensing;
   a determination unit constructed to determine, while the recording unit is performing the continuous recording of the moving image signal, whether the information newly received by said information reception unit differs from the information saved in said memory by continuously comparing the newly received information and the information saved in said memory; and
   a controller constructed to automatically generate timing data indicating a timing, while the recording unit is performing the continuous recording of the moving image signal, at which the information received by said information reception unit changes, at the time it is determined by said determination unit that the information newly received by said information reception unit differs from the information saved in said memory;
   wherein said recording unit further records the timing data generated by said controller by associating the timing data with the moving image signal, and
   wherein the recorded moving image signal is divided into periods based on the timing data, each period indicating a time band of moving images.

2. The apparatus according to claim 1, wherein the timing data includes period information which indicates a time period that corresponds to each of a plurality of pieces of information received during recording of the moving image signal.

3. The apparatus according to claim 2, wherein said controller determines the time period in response to a determination by said determination unit that the information newly received by said information reception unit differs from the information saved in said memory during recording of the moving image signal.

4. The apparatus according to claim 1, wherein said controller generates period information, which indicates a period of the moving image signal that corresponds to the information received during recording of the moving image signal, in accordance with a fact that reception of the information by said information reception unit is disabled during recording of the moving image signal.

5. The apparatus according to claim 1, wherein said recording unit generates a moving image file containing the recorded moving image signal, and records the timing data by storing it in a header or footer of the moving image file.

6. The apparatus according to claim 1, wherein said recording unit records the timing data as a file independent from a file containing the recorded moving image signal.

7. The apparatus according to claim 1, wherein the timing data consists of a plurality of items, and said recording unit records only selected items of the plurality of items.

8. The apparatus according to claim 1, wherein the information received by said information reception unit is associated with a predetermined area and includes location information.

9. The apparatus according to claim 1, wherein:
   said controller generates, during recording of the moving image signal, a plurality of the timing data; and
   said recording unit records the moving image signal and said plurality of timing data in association with each other.

10. The apparatus according to claim 1,
   wherein said recording unit performs a plurality of successive record operations to continuously record the moving image signal generated by said image sensing unit until the image sensing unit completes image sensing, and
   wherein during each record operation:
   the determination unit determines whether the information newly received by said information reception unit differs from the information saved in said memory by comparing the newly received information and the information saved in said memory, and
   in a case where it is determined by said determination unit that the information newly received by said information reception unit differs from the information saved in the memory, at the time of the determination, the controller automatically generates the timing data indicating the timing at which the information received by said information reception unit changes, and the recording unit records the moving image signal and the generated timing data in association with each other.

11. A control method of a recording apparatus for recording an image signal, comprising:
   an image sensing step of sensing an image of an object and generating a moving image signal, the moving image signal including two or more images;
   an information reception step of receiving information from an external source;
   a saving step of saving the information received by said information reception step in a memory;
   a recording step of performing a plurality of successive record operations to continuously record the moving image signal continuously generated in the image sensing step until the image sensing step completes image sensing;
   a determination step of using a determination unit to determine, while the recording step is performing the continuous recording of the moving image signal, whether the information newly received by said information reception step differs from the information saved in the memory by continuously comparing the newly received information and the information saved in the memory; and
   a controller step of using a controller to automatically generate timing data indicating a timing, while the recording step is performing the continuous recording of the moving image signal, at which the information received in said information reception step changes, at the time it is determined by the determination unit that the information newly received by said information reception step differs from the information saved in the memory;

wherein said recording step includes further recording the timing data generated in the controller step by associating the timing data with the moving image signal; and wherein the recorded moving image signal is divided into periods based on the timing data, each period indicating a time band of moving images.

12. The method according to claim 11, wherein the timing data includes period information which indicates a time period that corresponds to each of a plurality of pieces of information received during recording in the moving image signal.

13. The method according to claim 12, wherein the controller step includes a step of determining the time period in response to a determination by said determination step that the information newly received by said information reception step differs from the information saved in the memory during recording of the moving image signal.

14. The method according to claim 11, wherein the controller step includes a step of generating period information, which indicates a period of the moving image signal that corresponds to the information received during recording of the moving image signal, in accordance with a fact that reception of the information in the information reception step is disabled during recording of the moving image signal.

15. The method according to claim 11, wherein the recording step includes a step of generating a moving image file containing the recorded moving image signal, and recording the timing data by storing it in a header or footer of the moving image file.

16. The method according to claim 11, wherein the recording step includes a step of recording the timing data as a file independent from a file containing the recorded moving image signal.

17. The method according to claim 11, wherein the timing data consists of a plurality of items, and the recording step includes a step of recording only selected items of the plurality of items.

18. The method according to claim 11, wherein the information received by said information reception unit is associated with a predetermined area and includes location information.

19. The method according to claim 11, wherein:

said controller step generates, during recording of the moving image signal, a plurality of the timing data; and said recording step records the moving image signal and said plurality of timing data in association with each other.

20. The method according to claim 11, wherein said recording step performs a plurality of successive record operations to continuously record the moving image signal generated in said image sensing step until the image sensing is completed, and wherein during each record operation:

the determination unit determines whether the information newly received in said information reception step differs from the information saved in the memory by comparing the newly received information and the information saved in the memory, and in a case where it is determined by said determination unit that the information newly received in said information reception step differs from the information saved in the memory, at the time of the determination, the controller automatically generates the timing data indicating the timing at which the information received in said information reception step changes, and the recording step records the moving image signal and the generated timing data in association with each other.

21. A recording apparatus for recording an image signal comprising:

an image input unit constructed to input a moving image signal, the moving image signal including two or more images;

an information reception unit constructed to externally receive information;

a memory constructed to save the information received by said information reception unit;

a recording unit constructed to perform a plurality of successive record operations to continuously record the moving image signal continuously input by said image input unit until input from the image input unit is completed;

a determination unit constructed to determine, while the recording unit is performing the continuous recording of the moving image signal, whether the information newly received by said information reception unit differs from the information saved in said memory by continuously comparing the newly received information and the information saved in said memory; and a controller constructed to automatically generate timing data indicating a timing, while the recording unit is performing the continuous recording, at which the information received by said information reception unit changes, at the time it is determined by said determination unit that the information newly received by said information reception unit differs from the information saved in said memory;

wherein said recording unit further records the timing data generated by said controller by associating the timing data with the moving image data, and wherein the recorded moving image signal is divided into periods based on the timing data, each period indicating a time band of moving images.

22. A control method of a recording apparatus for recording an image signal, the method comprising:

an image input step of inputting a moving image signal, the moving image signal including two or more images;

an information reception step of externally receiving information;

a saving step of saving the information received by said information reception step in a memory;

a recording step of performing a plurality of successive record operations to continuously record the moving image signal continuously input by said image input step until input from the image input step is completed;

a determination step of using a determination unit to determine, while the recording step is performing the continuous recording of the moving image signal, whether the information newly received by said information reception step differs from the information saved in the memory by continuously comparing the newly received information and the information saved in the memory; and a controller step of using a controller to automatically generate timing data indicating a timing, while the recording step is performing the continuous recording, at which the information received by said information reception step changes, at the time it is determined by the determination unit that the information newly received by said information reception step differs from the information saved in the memory;

wherein said recording step includes further recording the timing data generated by said controller step by associating the timing data with the moving image data, and wherein the recorded moving image signal is divided into periods based on the timing data, each period indicating a time band of moving images.

* * * * *